United States Patent [19]

Zorb et al.

[11] Patent Number: 4,862,744
[45] Date of Patent: Sep. 5, 1989

[54] HOLDER AND SHUT OFF VALVE FOR A WATER FLOW CONTROL DEVICE

[75] Inventors: Larry D. Zorb; L. Harvey Wicklund, both of Bigfork, Mont.

[73] Assignee: A. Y. McDonald Manufacturing Company, Dubuque, Iowa

[21] Appl. No.: 119,980

[22] Filed: Nov. 13, 1987

[51] Int. Cl.⁴ ............................................. G01F 15/18
[52] U.S. Cl. ................................. 73/201; 137/614.06; 251/149.9
[58] Field of Search .............. 73/201, 273; 251/149.8, 251/149.9, 259, 260, 251; 137/614.06, 315; 285/30, 31, 315; 403/12

[56] References Cited

U.S. PATENT DOCUMENTS

| | | | |
|---|---|---|---|
| 974,651 | 11/1910 | Ford. | |
| 978,384 | 12/1910 | Lofton. | |
| 1,249,435 | 12/1917 | Lofton | 73/201 |
| 1,345,124 | 6/1920 | Calhoun | 137/315 |
| 4,368,904 | 1/1983 | Lanz | 285/175 |
| 4,516,753 | 5/1985 | Thomsen | 251/252 |
| 4,516,794 | 5/1985 | Zorb et al. | 285/30 |

Primary Examiner—Herbert Goldstein
Attorney, Agent, or Firm—Wood, Dalton, Phillips, Mason & Rowe

[57] ABSTRACT

An apparatus for mounting a flow measuring device between an input fluid line and an output fluid line has a sleeve with an opening therethrough mounted to a base and capable of reciprocating between extended and retracted positions. The sleeve secures the flow measuring device in the extended position and releases the device in the retracted position. A cam secures the sleeve in the retracted or extended positions. A valve is fixed to the sleeve such that, when the sleeve is in its extended position, fluid flows around the valve and through the sleeve. When the sleeve is in its retracted position to remove the flow measuring device, the valve seats on the input fluid line.

6 Claims, 1 Drawing Sheet

HOLDER AND SHUT OFF VALVE FOR A WATER FLOW CONTROL DEVICE

TECHNICAL FIELD

The present invention relates to an apparatus for mounting a flow measuring device, and more particularly to a mounting apparatus that shuts off the fluid flow during the removal of the measuring device.

BACKGROUND ART

A method for measuring the flow of fluids is to place a flow measuring device between two pipelines in which the fluid is flowing. For a variety of reasons, the measuring device has to be removed at times, for example, to determine the amount of fluid flow through the device, and for periodic calibration and repair.

Fluid flow must naturally be shut off when the measuring device is removed. Such shut off is not only inconvenient, but there is often leakage which complicates the task and adds to its convenience.

Commonly, fluid flow has been shut off during removal of a measuring device by shutting off a separate valve along the fluid line. At times, however, the person removing the device may forget to shut off fluid flow, or may mistakenly believe that it has been shut off when it has not been. This results in an unexpected spray of fluid, which can be particularly inconvenient during cold weather. Further, even if the valve is properly shut off, there is commonly fluid in the pipeline between the valve and the measuring device, which fluid will leak into the mounting apparatus.

In addition, the valve to be shut off is sometimes difficult to find. For example, if the valve is located on public property, during any type of construction, the valve can be inadvertently covered either by debris or permanent material such as an overlay. If the valve is on private property, the valve can become buried by failure to maintain the property.

The present invention is directed toward overcoming one or more of the problems as set forth above.

SUMMARY OF THE INVENTION

In one aspect of the present invention, an apparatus for securing a flow measuring device is provided with a sleeve mounted to a base, which sleeve reciprocates between extended and retracted positions. The sleeve has an opening therethrough connecting the input fluid line and the measuring device input, and engages the device input to secure the device when in the extended position. The sleeve releases the device for removal when in the retracted position. A valve member is secured to the sleeve by radial arms and has a seat concave toward the input line, which seat seals the input fluid when the sleeve is in the retracted position.

It is an object of the present invention to permit easy removal of a flow measuring device from a fluid line.

Another object of the present invention is to eliminate water leakage during the removal of said device.

Still another object of the present invention is to provide a readily accessible valve whose location and accessibility are not threatened by future occurrences.

DESCRIPTION OF THE PREFERRED EMBODIMENT

Figure 1:
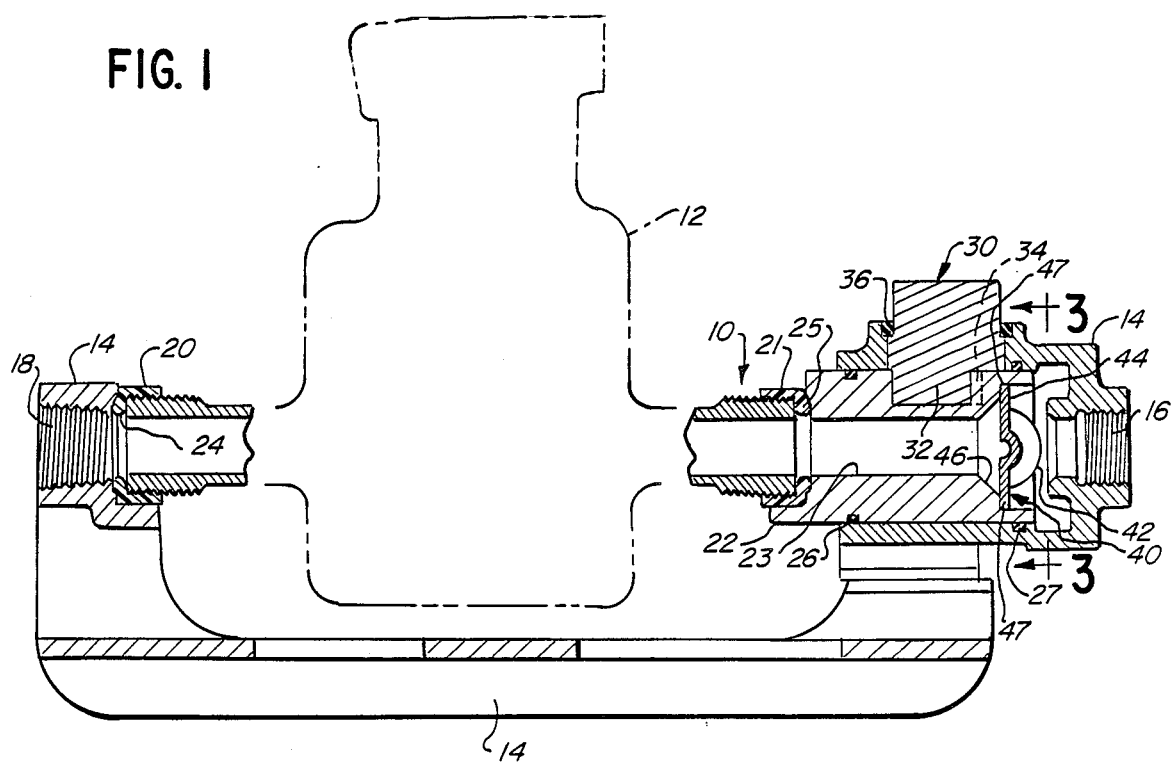
FIG. 1 is an elevational cross-sectional view of the apparatus with the sleeve in the extended position and a flow measuring device in place.

An apparatus 10 for mounting a flow measuring device 12 is shown in the figures and includes a cradle frame 14 secured between an input fluid line 16 and output fluid line 18. The measuring device 12 (such as a water meter used to measure water usage, e.g., at a residence) is secured between resilient cup gaskets 20, 21, the gaskets 20 and 21 formed from a generally flexible material, for example, rubber, with one of the gaskets 20 bearing against the cradle frame 14 at the output side and the other gasket 21 bearing against a reciprocating sleeve 22 at the input side. The sleeve 22 has an opening 23 therethrough is secured within the cradle frame 14 and.

The gaskets 20, 21 have an annular bead 24, 25 around their inner openings, which beads 24, 25 are compressed during mounting (as will be apparent) so as to prevent fluid leakage therethrough.

The sleeve 22 is reciprocally mounted to the cradle frame 14 at its input side. In its extended position, as shown in FIG. 1, the sleeve 22 secures the measuring device 12 in the apparatus 10, with both gaskets beads 24, 25 compressed. In its retracted position (see FIG. 2), the sleeve 22 is clear of the measuring device 12, allowing the device 12 to be removed and replaced for service or the like.

To prevent leakage between the sleeve 22 and cradle frame 14, O-rings 26, 27 are provided therebetween.

Reciprocation of the sleeve 22 may be manually accomplished, and the sleeve 22 positively secured by the cradle frame 14 in either the extended or retracted position, by turning a knob 30 having a suitable cam 32 thereon received in a cam recess 34 in the sleeve 22. An exemplary cam structure which is known to be suitable is disclosed in U.S. Pat. No. 4,516,794, the disclosure of which is hereby incorporated by reference. A dirt gasket 36 is fitted between the knob 30 and the cradle frame 14.

Figure 3:
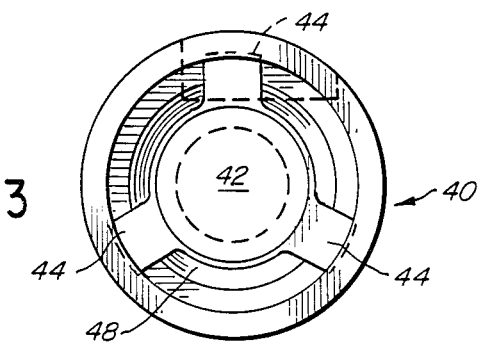
FIG. 3 is a cross-sectional view of the valve taken along line 3—3 of FIG. 1.

A valve 40 having a concave seat 42 with radial arms 44 is secured to the sleeve 22 adjacent the input fluid line 16. The invention comtemplates the arms being rectangular in shape (see FIG. 3) although the invention does not limit the arms 46 to any particular shape. The diameter of the concave seat 42 is greater than the inner diameter of the input fluid line 16. The sleeve 22 has a flared opening 46 with a shoulder 47 at its input end, which opening 46 has a greater diameter than the concave seat 42 to allow fluid to flow around the seat 42 and through passages 48 between the radial arms 44.

Alternatively, the valve could be free floating between the sleeve 22 and the input fluid line 16 (i.e., not fixed to the sleeve 22), and engaged by the sleeve 22 to close the fluid line 16 only when the sleeve 22 is retracted (as will be apparent to a skilled artisan with an understanding of the present invention).

When the sleeve 22 is in its extended (i.e., normal) position as shown in FIG. 1, the valve 40 is spaced from the input fluid line 16, allowing fluid to flow through the apparatus 10 and measuring device 12.

When the flow measuring device 12 is to be removed from the apparatus 10, an operator turns the knob 30

Figure 2:
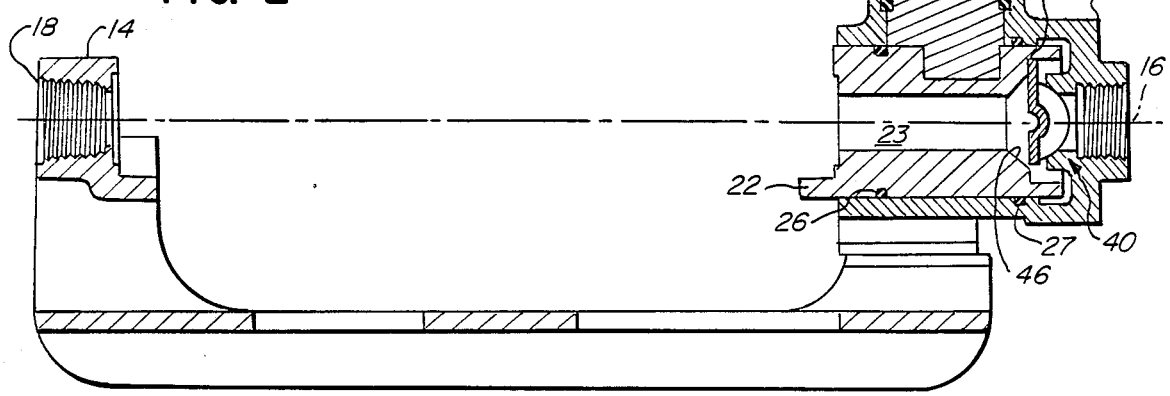
FIG. 2 is a view similar to FIG. 1 but with the sleeve in the retracted position and the flow measuring device removed.

(and cam 32), to reciprocate the sleeve 22 to its retracted position as shown in FIG. 2, with the cup gaskets 20, 21 disengaged so that the device 12 can be removed. Simultaneously, the valve 40 is seated upon the input fluid line 16, to prevent any fluid flow with the device 12 removed.

If the valve 40 is free floating, as the sleeve 22 is retracted (moves to the right in FIG. 1), the shoulder 47 of the sleeve 22 engages the radial arms 44 of the valve 40 and moves the valve 40 toward the input fluid line 16 and the valve 40 seats thereon.

To mount the measuring device 12, the operator turns the knob 30 (and cam 32) to its original position, causing the sleeve 22 to move to its extended position, securing the device 12 in the apparatus 10 and unseating the valve 40 to again allow fluid flow therethrough.

Other aspects, objects and advantages of the invention can be obtained from a study of the drawings, the specification, and the appended claims.

I claim:

1. An apparatus for securing an input and an output of a flow measuring device between an input fluid line and an output fluid line comprising:
    a cradle frame securing the input and output fluid lines;
    a sleeve mounted to the cradle frame and capable of reciprocating between an extended position and a retracted position, said sleeve having an opening therethrough connecting the input fluid line and measuring device input, said sleeve engaging the device input to secure the device when in the extended position and releasing the device for removal in the retracted position;
    a means for securing the sleeve in either selected extended or retracted positions; and
    a valve fixed to the sleeve and adapted to seat on the input fluid line when the sleeve is in the retracted position.

2. The apparatus of claim 1, wherein said valve has a seat concave toward the input fluid line and radial arms fixed to the sleeve.

3. The apparatus of claim 2, wherein the sleeve opening at the connection to the valve arms has a greater diameter than the concave seat.

4. An apparatus for mounting and releasing a flow measuring device between an input fluid line and an output fluid line, comprising:
    a sleeve mounted between the device and input flow line and having an opening therethrough joining the input fluid line and the measuring device, and further having a shoulder facing the input fluid line, said sleeve reciprocating between an extended position securing the device and a retracted position releasing the device;
    means for positioning said sleeve in the extended or retracted positions; and
    a valve member between the sleeve and input fluid line, said valve member engaging the sleeve shoulder to seat over the input fluid line when the sleeve is in the retracted position.

5. The apparatus of claim 4, wherein said valve member has a seat concave toward the input fluid line.

6. The apparatus of claim 4, wherein said valve member is free floating.

* * * * *